(No Model.)

H. A. LEE.
SALT HOLDER.

No. 485,328.  Patented Nov. 1, 1892.

Witnesses
Chas. H. Smith
J. Staib

Inventor
Henry A. Lee
per Lemuel W. Serrell
Atty.

UNITED STATES PATENT OFFICE.

HENRY A. LEE, OF PLAINFIELD, NEW JERSEY.

SALT-HOLDER.

SPECIFICATION forming part of Letters Patent No. 485,328, dated November 1, 1892.

Application filed March 7, 1892. Serial No. 424,018. (No model.)

*To all whom it may concern:*

Be it known that I, HENRY A. LEE, a citizen of the United States, residing at Plainfield, in the county of Union and State of New Jersey, have invented an Improvement in Salt-Holders, of which the following is a specification.

In Letters Patent No. 342,885, granted June 1, 1886, a hopper is represented with a cover, and into this hopper a brick or block of compressed salt or feed is introduced and the lower end of the hopper is open and at an inclination, the front of the hopper being closed. In this construction the block of salt is consumed by the animal licking the lower surface, and such block slides down gradually as the lower end is consumed; but in consequence of the holder being closed atmospheric moisture may condense and soften the salt, and there is not free opportunity for the same to dry off during fine weather, and, besides this, if the salt becomes wedged into the hopper in consequence of moisture or otherwise there is no opportunity for the animal to have access to the same.

The present invention is made for holding the block or brick of salt in a fixed position, so that it cannot slide down or be pushed upwardly by the action of the tongue, and so that the animal will have opportunity to lick the block or brick until it is all consumed, or nearly so, and the salt is protected from the teeth of the animal, so that the same will not become broken up or disintegrated by any cribbing operation.

In carrying out my invention I provide a holder, preferably of metal, into which the brick or block fits comparatively loosely, and a movable bar is inserted above the top of the block to prevent it being raised by the action of the tongue, and there are stationary ledges at the bottom of the holder, upon which the salt rests, and the front is open sufficiently for the tongue of the animal to pass in to lick the salt, but the sides extend or lap over the front of the block or brick sufficiently to protect the same, and the opening between the lapping edges is such that the animal cannot reach the block or brick of salt with the teeth. Hence there is no opportunity to crib or bite the salt.

Figure 1:
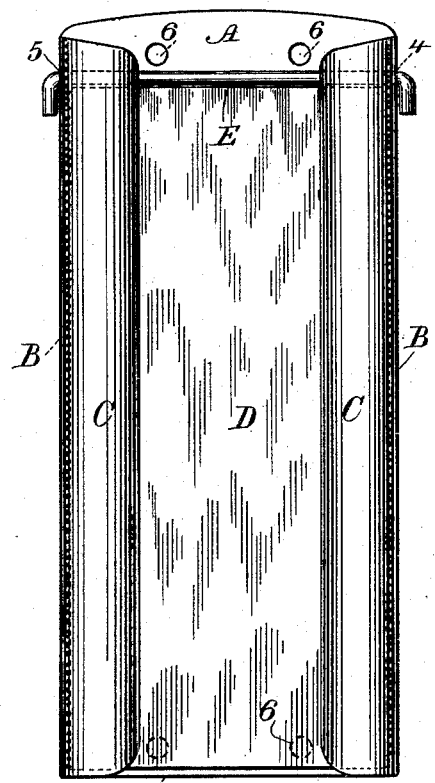
Figure 3:
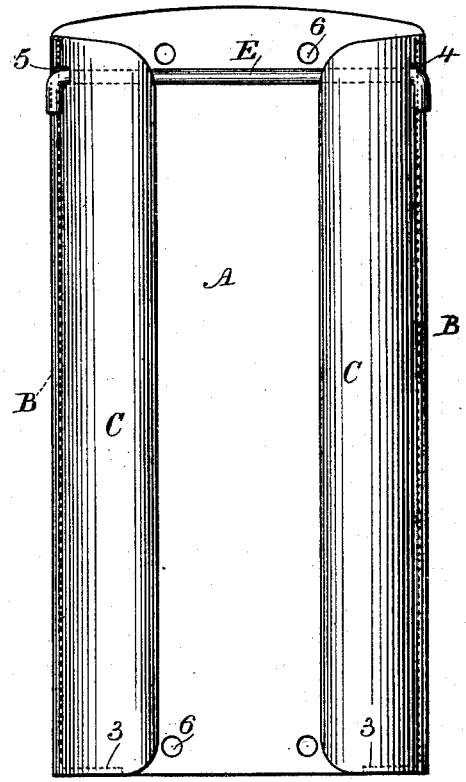
Figure 2:
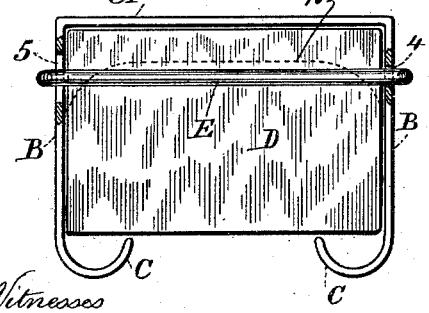
Figure 4:
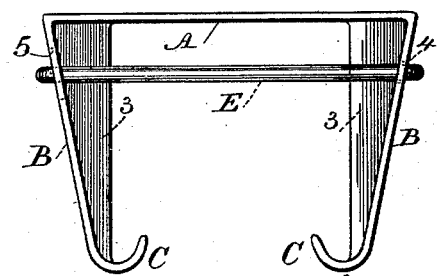

In the drawings, Figure 1 is an elevation, and Fig. 2 is a plan view, partially in section, representing the holder for a square brick; and Fig. 3 is an elevation, and Fig. 4 is a plan view, of a holder adapted to receive a brick or block with beveled sides.

The holder is made with the back A, sides B, and with the inwardly-projecting edges C, so that there is an opening between the edges C of the desired width for exposing the proper portion of the salt brick or block D to the action of the tongue of the animal, and it is advantageous to form the edges C rolled or rounded and sufficiently near together to prevent the animal's teeth reaching the block or brick of salt and to lessen the risk of the edges of the holder being grasped between the teeth of the animal if the horse is disposed to crib.

With the holder adapted to the square block of salt the ledge 2 at the bottom may extend across the back, and upon it the lower end of the brick or block of salt may rest; and with the holder adapted to the brick or block of salt with beveled sides it is advantageous to make the ledges 3 in the form shown in Fig. 4, so that the same occupy the triangular positions between the inclined sides of the case and the back, so that the block or brick of salt may rest at its lower end upon such ledges 3; but with the beveled sides then inwardly-projecting edges may or may not be used.

In order to prevent the block or brick of salt being raised in the holder by the action of the tongue, a bar E is made use of, such bar being preferably in the form of a stout wire with right-angled ends, the bar being inserted through a hole 4 at one side and passed across over the block or brick, with the right-angled end going through a slot 5 at the other side of the case, so that the bar will remain in its position when the right-angled ends hang downwardly, or the bar can be easily removed for the insertion of another brick or block.

It is generally advantageous to provide screw-holes 6, for attaching the holder to a wall, post, or other suitable support.

It will be apparent that the animal has free access to the block or brick of salt through the front opening, and by the tongue a channel will be licked in the front of the block, and this channel can widen in either direction and the salt will remain in the holder until almost all of the same has been licked away.

It will be understood that the block or brick is to be composed of salt that has been firmly compressed, so as to be sufficiently hard to withstand the licking operation without becoming disintegrated or crumbling.

This holder might be employed for compressed feed as well as salt, although primarily designed for the latter.

I claim as my invention—

1. A holder for a block or brick of salt or similar material, having a back and two vertical sides and inwardly-extending front edges, and a rigid ledge at the lower end of the holder, upon which the bottom end of the block or brick of salt rests, the opening at the bottom and in the front of the holder being wide enough for the tongue of the animal to pass to the said brick or block when licking the same and sufficiently narrow to protect such block or brick from the teeth of the animal, substantially as set forth.

2. A holder for a block or brick of salt or similar material, having a rigid ledge at the bottom of the holder for the lower end of the brick to rest upon, and a back and vertical sides that are inclined toward each other at the front, with an opening at the bottom and between the sides, by which the tongue of the animal is permitted to reach the block or brick, substantially as set forth.

3. A holder for a block or brick of salt or similar material, having a rigid ledge at the bottom of the holder for the lower end of the brick to rest upon, a back and vertical sides that are inclined toward each other at the front, and provided with inwardly-projecting front edges with an opening at the bottom and between the sides, by which the tongue of the animal is permitted to reach the block or brick, substantially as set forth.

4. A holder for a block or brick of salt or similar material, having a back, vertical sides, and inwardly-projecting and rounding front edges, and a ledge at the bottom of the holder for the block or brick to rest upon, the opening between the inwardly-projecting rounding front edges being sufficiently wide for allowing the tongue of the animal to reach the block in licking the same, substantially as set forth.

5. The holder for a block or brick of salt, having an opening in the front and closed sides and a movable cross-bar passing through the sides for holding the brick down in position, substantially as set forth.

Signed by me this 4th day of March, 1892.

HENRY A. LEE.

Witnesses:
GEO. F. PINCKNEY,
WILLIAM G. MOTT.